Nov. 7, 1950     W. L. BERSSENBRUGGE     2,528,681
OPTICAL INDICATOR
Filed March 1, 1948
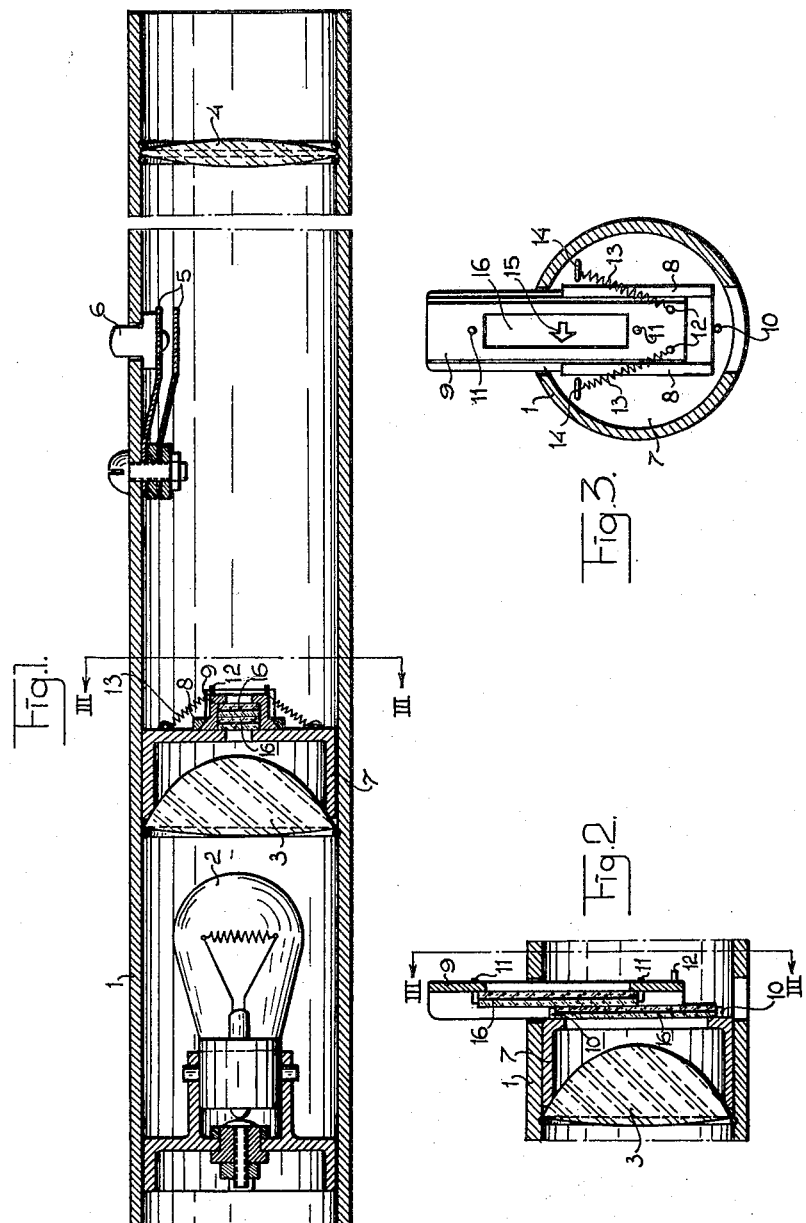
Inventor:
W. L. Berssenbrugge Patented Nov. 7, 1950

2,528,681

UNITED STATES PATENT OFFICE 2,528,681

OPTICAL INDICATOR

Willem Lodewijk Berssenbrugge,
The Hague, Netherlands

Application March 1, 1948, Serial No. 12,302
In the Netherlands March 5, 1947

6 Claims. (Cl. 88—24)

With the projection of lantern-slides a pointer is often used to indicate different parts of the picture. For stereoscopic projection this means cannot be used, because the person giving the explanations in regard to the picture has to look at it, like the spectators, from a distance through spectacles with complementarily colored or polarized glasses in order to get a good stereoscopic impression.

The use of an optical indicator for pointing at parts of a projected picture is well known. An optical indicator is a projection system enabling a luminous figure, mostly in the shape of an arrow, to be projected on the picture. Such an indicator may also be applied to stereoscopic projection.

The invention is based on the knowledge that in the last-mentioned case the clearness of the indication can be very much improved by projecting the luminous figure stereoscopically too, in such a way that it can be moved not only in the plane of the picture but also in the depth of it. In this case parts of the picture lying apparently farther or less far from the spectator, can be indicated by a luminous figure corresponding to their particular position.

In order to attain the object in view, the optical indicator according to the invention has been provided with means for projecting, with complementarily colored or polarized light, two identically equal luminous figures at an adjustable mutual distance.

If these luminous figures coincide in the plane of the picture, one single resulting figure in the plane of the picture is observed by the spectator. If the two figures do not coincide, the indication appears stereoscopically in front of or behind the plane of the picture. The mutual distance, measured in a positive or a negative sense, of the two luminous figures in the plane of the picture is a measure for the distance at which the spectator observes the indication. By making the mutual distance adjustable, the indication can be brought apparently in front of or behind the plane of the picture.

It is possible to use a common projection system with two object-carriers through which the same beam of light passes, and a common objective. In this case the stereoscopic image of the indicating figure is projected in a subtractive way by withdrawing different color or polarization components from the common projection light.

An indicator of this type has great advantages over indicators of other types, the construction being much simpler by the use of only one projection system.

The object-carriers can in this case consist of light filters being movable in regard to each other, each of them being provided with a non-filtering part in the shape of the luminous figure. According to the invention one of the object-carriers is preferably fitted in a slide which can be moved in regard to the other object-carrier by means of an actuating member. The slide can, for instance be put under the action of a spring, so that it is possible to attain the desired relative motion of the two object-carriers by simple pressure or pulling. For this purpose the actuating member may be made as a part of the slide, protruding beyond the indicator.

As will be indicated later on it is particularly advisable, when use is made of a common projection system, to make each object-carrier as a light filter with a discolored or a depolarized part in the shape of the luminous figure.

The invention will be explained more in detail with reference to the drawing showing an embodiment with a common projection system and in which:

Fig. 1 is a longitudinal section of the indicator,

Fig. 2 is another longitudinal section, perpendicular to that of Fig. 1, of the part in which the object-carriers are placed, and Fig. 3 is a cross-section according to III—III in Figs. 1 and 2.

The indicator consists of a tube 1, in which a projection system with a light source 2, a condenser 3 and an objective 4 have been fitted. An image of the light source 2 is formed in the objective 4 by the condenser 3. 5 is a switch by means of which the light source 2 can be switched on or off by pressure upon the button 6. The connections, necessary for this purpose, are not indicated in the drawing.

7 is a member for supporting the object-carriers. This member has been provided with a guide 8, over which, in a direction perpendicular to the axis of the tube 1, a slide 9 of U-shaped cross-section can be moved. The object-carriers 16 are fitted between the member 7 and the slide 9. Each object-carrier 16 is supposed to be mounted between two glass plates. So there are four glass plates in all. As seen in Fig. 2 the plates belonging to one object-carrier 16 are fitted between two pins 11, fixed in the slide 9 and those of the other object-carrier 16 between two pins 10 on the member 7. If the slide 9 is moved in regard to the member 7, the two object-carriers 16 will thus be moved in regard to each other.

On the slide 9 two pins 12 are fixed; they are connected with two eyelets 14 on the member 7 by means of tension springs 13. By means of the springs 13 the slide 9 is pulled into the position shown in Figs. 2 and 3. So, if pressure is exerted upon the free end of the slide 9, the object-carriers can be brought into any position in regard to each other.

Each object-carrier 16 consists of a color or polarization filter and has in the center thereof a non-filtering part in the shape of an arrow 15 which is visible in Fig. 3 for the outer object-carrier 16. By moving the slide 9, the two arrows can be made to cover each other or can be removed from each other.

The light from the condenser 2 goes through both object-carriers. Through the non-filtering part of each object-carrier, light is transmitted in which the color or polarization component, cut off by the other object-carrier, is absent. In this way two luminous arrows of complementary colors or polarization directions are projected by the indicator, leading together to the stereoscopic projection of the indicating figure. By moving the slide 9, this figure can be brought apparently in front of, into or behind the projection plane, so that the depth-indication aimed at is attained.

The indicator according to the represented embodiment is preferably dimensioned in such a way that the switch-button 6 as well as the slide 9 can be actuated by one hand. The button 6 can be pressed, for instance, by the thumb, and the slide 9 by one of the other fingers.

As mentioned above, it is advisable when using a common projection system, to make each object-carrier as a light filter with a discolored or depolarized part in the shape of the luminous figure. It is also possible to provide the object-carrier with an aperture in the shape of this figure. This embodiment, however, is less desirable because practice has shown that in this case the spectator faintly observes each of the two projected luminous figures, even with the non-corresponding eye. This hinders one in obtaining a good stereoscopic impression. Presumably this phenomenon is due to the fact that each of the object-carriers made as a color or polarization filter produces a certain retardation, even of light of the corresponding type. If a part of the filter is discolored or depolarized, this retardation remains in this part; if, however, an aperture is made in the filter, this aperture is outlined brightly against the rest of the filter, which has a disturbing effect.

The indicator according to the invention, no matter how it is made, can of course be provided with means for focussing the projected luminous figures. These means, however, do not form part of the invention.

What I claim is:

1. A stereoscopic projection pointer comprising a light source, a condenser lens and an objective, two filtering object-carriers mounted between said condenser lens and said objective and at the conjugate focus of said objective, identical non-filtering figures on each said object carrier, one said object carrier being movable with respect to the other, whereby said figures can be stereoscopically projected with complementary filtered light by moving one said object-carrier with respect to the other.

2. A stereoscopic projection pointer comprising a light source and an objective, two complementary filtering object-carriers mounted between said light source and said objective and adjacent the conjugate focal plane of said objective, identical non-filtering figures on each said object-carrier, one said object-carrier being movable with respect to the other, whereby said figures can be stereoscopically projected with complementary filtered light by moving said object-carrier with respect to the other.

3. In a stereoscopic projection pointer as claimed in claim 2, a support for said object-carriers, a slide movably supported by said support, said slide carrying said movable object carrier, spring means secured to said slide normally maintaining said figures out of register by non-alignment of said object-carriers and an actuating member for moving said slide for adjustment of said object carriers.

4. In a stereoscopic projection pointer as claimed in claim 3, a portion of said slide extending out of the housing for said pointer and comprising said actuating member.

5. In a stereoscopic projection pointer as claimed in claim 2, each said object-carrier comprising a polarizing light filter, said figures being non-polarized.

6. In a stereoscopic projection pointer as claimed in claim 2, each said object-carrier comprising a color light filter, said figures being non-colored.

WILLEM LODEWIJK BERSSENBRUGGE.

REFERENCES CITED

The following references are of record in the file of this patent:

UNITED STATES PATENTS

| Number | Name | Date |
|---|---|---|
| 778,891 | Rausch | Jan. 3, 1905 |
| 934,916 | Von Hofe | Sept. 21, 1909 |
| 1,503,766 | Pictet et al. | Aug. 5, 1924 |
| 1,599,718 | Roach | Sept. 14, 1926 |
| 1,665,426 | Verdich | Apr. 10, 1928 |
| 2,307,981 | Babcock et al. | Jan. 12, 1943 |
| 2,357,542 | Pfeil | Sept. 5, 1944 |